United States Patent Office 3,413,281
Patented Nov. 26, 1968

3,413,281
METHOD FOR THE PRODUCTION OF RIBOFLAVIN-5'-MONOPHOSPHATE
Mikio Honjo and Kin-Ichi Imai, Takatsuki, Haruomi Honda, Ikeda, and Yoshio Yoshioka, Osaka, Japan, assignors to Takeda Chemical Industries, Ltd., Osaka, Japan
No Drawing. Filed Dec. 12, 1966, Ser. No. 600,758
Claims priority, application Japan, Dec. 14, 1965, 40/77,171
11 Claims. (Cl. 260—211.3)

ABSTRACT OF THE DISCLOSURE

Riboflavin is phosphorylated with pyrophosphoryl tetrachloride in the presence of certain organic compounds (phenols, nitriles, esters, mononitro compounds) whereby primary OH is selectively phosphorylated, and riboflavin-5'-monophosphate is obtainable in high yield.

---

This invention concerns a method for the production of riboflavin-5'-monophosphate which comprises reacting riboflavin with a pyrophosphoryl tetrachloride in the presence of a specific organic compound, followed by subjecting the resultant product to hydrolysis.

Riboflavin-5'-monophosphate is known to be useful as a biochemically active ingredient of a co-enzyme.

Heretofore, for the production of riboflavin-5'-monophosphate, phosphorylation methods using various phosphorylating agents such as phosphorus pentoxide, orthophosphoric acid, pyrophosphoric acid and metaphosphoric acid, have been known and used.

However, these known phosphorylation methods are, so far as the industrial production of riboflavin-5'-monophosphate is concerned, not satisfactory from the viewpoints of yield and purity of the objective riboflavin-5'-monophosphate.

That is, according to the known processes, riboflavin-5'-diphosphate, riboflavin-5'-polyphosphate (e.g. triphosphate), and riboflavin-3',5'-diphosphate are formed in a large amount in addition to the object riboflavin-5'-monophosphate, with the result of reducing the yield of the object compound.

Although many attempts have been made to overcome the foregoing disadvantage, none of them, so far as the present inventors are aware, has been entirely successful.

The present invention is based upon the unexpected fact that, in the preparation of riboflavin-5'-monophosphate from riboflavin, only primary OH in the riboflavin is selectively phosphorylated, if pyrophosphoryl tetrachloride, the phosphorylating agent, is employed together with a specific organic compound.

The present invention thus comprises reacting riboflavin with pyrophosphoryl tetrachloride in the presence of organic compound selected from the class consisting of phenols, nitrile compounds having 2 to 8 carbon atoms, esters of organic acid having a maximum of 3 carbon atoms and mononitro compounds having a maximum of 7 carbon atoms, followed by subjecting the reaction product to hydrolysis.

It is an object of the present invention to provide an industrially feasible method for the production of riboflavin-5'-monophosphate from riboflavin.

It is also an object of the present invention to prepare riboflavin-5'-monophosphate from the riboflavin in a good yield with high purity by a simple procedure.

The present method for the production of riboflavin-5'-monophosphate is a preferable one from an industrial point of view, since it easily and in relatively short time affords the desired riboflavin-5'-monophosphate in a good yield with high purity.

The phenols used in the present invention can be exemplified by monophenols such as phenol, naphthol, o-chlorophenol, 2,6-dichlorophenol, 2,3,6-trimethylphenol, thymol, cresol (o-, m- and p-cresol and the mixture thereof), xylenols, and polyphenols such as catechol, resorcinol, phloroglucinol, etc.

Among the phenols, monophenols are best, and especially phenol, o-chlorophnol, cresol (o-, m-, or p-cresol or a mixture thereof) and the several xylenols are desirably employed.

The nitrile compounds used in the present invention are those having 2 to 8 carbon atoms and are exemplified by aliphatic mononitriles such as acrylonitrile, acetonitrile, propionitrile, butyronitrile, aliphatic dinitriles such as malononitrile and succinonitrile, and aromatic nitriles such as benzonitrile, benzylnitrile, tolunitrile, etc.

Among the nitrile compounds, acrylonitrile, benzylnitrile, acetonitrile, malononitrile and benzonitrile are especially advantageous, and particularly acetonitrile, malononitrile and benzonitrile give best results.

The organic acid esters used in the present invention are esters of organic carboxylic acid having a maximum of 3 carbon atoms such as acetic acid, propionic acid, etc. As the esters, methyl-, ethyl-, propyl-, butyl-, vinyl-, phenyl-, etc. esters of these organic carboxylic acids are advantageously employed, and among these especially ethyl acetate and methyl acrylate give best results.

The nitro compounds used in the present invention are nitrohydrocarbons having a maximum of 7 carbon atoms and are exemplified by nitromethane, nitroethane, nitrobenzene, m-nitrotoluene, etc. Among the nitro compounds, the aliphatic or aromatic mononitro compounds are advantageously employed and especially nitromethane and nitrobenzene give the best results.

Of all the organic compounds mentioned above, the nitrile compounds are most desirable from the viewpoint of reaction time required.

Riboflavin, the organic compound and the pyrophosphoryl tetrachloride need not be in a pure state. The amount of the organic compound and pyrophosphoryl tetrachloride used varies with the former. Generally speaking, the pyrophosphoryl tetrachloride is used in an amount of from about 2 about 15 moles, more particularly from about 2 to about 10 moles, relative to the riboflavin, and the organic compounds are employed in an amount from about 40 to about 400 moles, more especially from about 50 to about 200 moles in the case of the phenols, about 50 to about 200 moles in the case of the nitrile compounds, about 50 to about 200 moles in the case of the organic acid esters, about 50 to about 200 moles in the case of the nitro compounds, per mole of riboflavin.

The reaction proceeds easily at not higher than room temperature (about 20° to about 35° C.) for about 1 to about 2 hours in pyrophosphoryl tetrachloride but, if desired, it may be carried out under heating or cooling.

As the organic compounds act as solvents, no reaction solvent is required but, if necessary, a suitable solvent (e.g. benzene, xylene, dioxane, etc.) may be used together with the organic compounds, so long as it does not inhibit the reaction.

In this way, only primary hydroxy group in riboflavin is selectively phosphorylated.

The thus-obtained product is then subjected to hydrolysis to give the objective riboflavin-5'-monophosphate.

The hydrolysis is carried out by per se known procedure, for example, by pouring the reaction mixture into water, preferably cooled water, or by adjusting the pH value of the reaction mixture obtained in the first step to the weakly acid area, desirably to about pH 1 to about 2, by adding an alkaline material (e.g. sodium hydroxide, potassium hydroxide, sodium carbonate, potassium carbonate in e.g. aqueous solution form).

As detailed above, by the present invention riboflavin-5'-monophosphate can easily be obtained in a short period of time in a good yield and high purity by a simple process.

Riboflavin-5'-monophosphate can be obtained in the free form or in the form of its salt such as barium salt, sodium salt, potassium salt or ammonium salt. When the riboflavin-5'-monophosphate obtained is of the free type, it can be changed into a desired salt by per se conventional methods, and in case the riboflavin-5'-monophosphate is obtained in a salt form, it can also be changed into the free form upon necessity.

For the purpose of giving those skilled in the art a better understanding of the invention, the following examples of presently preferred embodiments are given. Parts by weight bear the same relation to parts by volume as do grams to milliliters.

Example 1

To 3.8 parts by weight of riboflavin suspended in 200 parts by volume of acetonitrile are added 10 parts by volume of pyrophosphoryl tetrachloride at 0–5° C.

The mixture is stirred under the same temperature for 1 hour to allow a reaction to take place. The reaction mixture is poured into 500 parts by volume of ice water and the whole mixture is concentrated. The concentrate is adsorbed on a column of 50 parts by weight of activated charcoal. The column is eluted with 1000 parts by volume of a mixture of ethanol, butanol, water and concentrated aqueous ammonia (45:5:48:2 parts by volume, respectively).

To the eluate is added 200 parts by volume of N-aqueous solution of sodium hydroxide, followed by concentration. Thus-obtained concentrate is adjusted to pH 4 with N-hydrochloric acid, followed by addition of methanol, whereby 4.3 parts by weight of sodium salt of riboflavin-5'-monophosphate (calculated as anhydride) is obtained. Yield 90%.

When benzonitrile is used in place of acetonitrile, substantially the same result is obtained.

Example 2

To 3.8 parts by weight of riboflavin suspended in 200 parts by volume of ethyl acetate is added 10 parts by volume of pyrophosphoryl tetrachloride at 0–5° C.

The mixture is stirred under the same temperature for 2 hours to allow a reaction to take place. The reaction mixture is treated in the same manner as in Example 1 to give 4.3 parts by weight of crystals of sodium salt of riboflavin-5'-monophosphate (calculated as anhydride). Yield 90%.

When methyl acrylate is used in place of ethyl acetate, substantially the same result is obtained.

Example 3

To 3.8 parts by weight of riboflavin suspended in 200 parts by volume of nitrobenzene is added 10 parts by volume of pyrophosphoryl tetrachloride at 0–5° C.

The mixture is stirred under the same temperature for 2 hours to allow a reaction to take place.

The reaction mixture is treated in the same manner as in Example 1 to give 4.3 parts by weight of crystals of sodium salt of riboflavin-5'-monophosphate (calculated as anhydride). Yield 90%.

When nitromethane is used in place of nitrobenzene, substantially the same result is obtained.

Example 4

To 3.8 parts by weight of riboflavin suspended in 200 parts by volume of m-cresol is added 10 parts by volume of pyrophosphoryl tetrachloride at 0–5° C.

The mixture is stirred at the same temperature for 2 hours to allow a reaction to take place. The reaction mixture is treated in the same manner as in Example 1 to give 4.3 parts by weight of crystals of sodium salt of riboflavin-5'-monophosphate (calculated as anhydride). Yield 90%.

When o-chlorophenol or 2,6-dichlorophenol is used in place of m-cresol, substantially the same result is obtained.

Having thus disclosed the invention, what is claimed is:

1. A method for the production of riboflavin-5'-monophosphate, which comprises reacting riboflavin with pyrophosphoryl tetrachloride in the presence in the reaction mixture of an organic compound selected from the class consisting of phenols, nitrile compounds with 2 to 8 carbon atoms, esters of organic acids with a maximum of 3 carbon atoms, and nitro compounds with a maximum of 7 carbon atoms.

2. A method according to claim 1, wherein the organic compound is nitrile with 2 to 8 carbon atoms.

3. A method according to claim 1, wherein the organic compound is acetonitrile.

4. A method according to claim 1, wherein the organic compound is ethyl acetate.

5. A method according to claim 1, wherein the organic compound is nitrobenzene.

6. A method according to claim 1, wherein the organic compound is m-cresol.

7. A method according to claim 1, wherein the molar proportion of pyrophosphoryl tetrachloride to riboflavin is about 2 to about 10.

8. A method according to claim 1, wherein the molar proportion of phenol to riboflavin is about 50 to about 200.

9. A method according to claim 1, wherein the molar proportion of nitrile compound to riboflavin is about 50 to about 200.

10. A method according to claim 1, wherein the molar proportion of organic acid ester to riboflavin is about 50 to about 200.

11. A method according to claim 1, wherein the molar proportion of nitro compound to riboflavin is about 50 to about 200.

References Cited

UNITED STATES PATENTS 3,201,389　8/1965　Fujimoto et al. ____ 260—211.5
3,290,285　12/1966　Senoo et al. _____ 260—211.5

FOREIGN PATENTS 687,980　2/1953　Great Britain.

LEWIS GOTTS, *Primary Examiner.*

JOHNNIE R. BROWN, *Assistant Examiner.*